(12) United States Patent
Westby

(10) Patent No.: US 7,637,158 B2
(45) Date of Patent: Dec. 29, 2009

(54) EXCITATION IN MICROMECHANICAL DEVICES

(75) Inventor: Eskild Westby, Horten (NO)

(73) Assignee: Infineon Technologies Sensonor AS, Horten (NO)

( * ) Notice: Subject to any disclaimer, the term of this patent is extended or adjusted under 35 U.S.C. 154(b) by 197 days.

(21) Appl. No.: 11/539,181

(22) Filed: Oct. 6, 2006

(65) Prior Publication Data

US 2007/0111362 A1 May 17, 2007

(30) Foreign Application Priority Data

Nov. 4, 2005 (EP) ................... 05256842

(51) Int. Cl.
*G01C 19/56* (2006.01)
(52) U.S. Cl. ..................................... 73/504.14; 331/156
(58) Field of Classification Search .............. 73/504.12, 73/504.14, 504.15, 504.16; 331/156
See application file for complete search history.

(56) References Cited

U.S. PATENT DOCUMENTS

| 4,381,672 A | * | 5/1983 | O'Connor et al. ......... 73/504.15 |
| 4,732,647 A | | 3/1988 | Aine |
| 4,891,255 A | * | 1/1990 | Ciarlo ........................ 428/131 |
| 5,537,872 A | * | 7/1996 | Frere et al. ............... 73/504.12 |
| 5,723,790 A | * | 3/1998 | Andersson ............... 73/514.36 |
| 6,467,349 B1 | * | 10/2002 | Andersson et al. ....... 73/504.14 |
| 2003/0196490 A1 | | 10/2003 | Cardarelli |

FOREIGN PATENT DOCUMENTS

DE 4228795 A1 3/1994

* cited by examiner

*Primary Examiner*—John E Chapman
(74) *Attorney, Agent, or Firm*—Edell, Shapiro & Finnan, LLC

(57) ABSTRACT

A resonant structure for a micromechanical device includes a crystalline silicon beam and at least one mass attached to the beam. An excitation plane of the resonant structure is defined by the predominant motion of the excited resonant structure. The beam includes crystal axes aligned such that none of the crystal axes are parallel to the length of the beam and/or none of the crystal axes are normal to the excitation plane.

7 Claims, 3 Drawing Sheets

EXCITATION IN MICROMECHANICAL DEVICES

CROSS REFERENCE TO RELATED APPLICATIONS

This application claims priority under 35 U.S.C. §119 to Application No. EP 05256842.5 filed on Nov. 4, 2005, entitled "Excitation in Micromechanical Devices," the entire contents of which are hereby incorporated by reference.

FIELD OF THE INVENTION

The claimed device relates to excitation of structures in micromechanical devices.

BACKGROUND

Micromechanical sensing devices are known which sense external movement through changes in the motion of an excited sensing element. An example of such a sensing device is an angular rate sensor, used in applications such as rollover detection for vehicles.

The necessary positioning of components in a device such as an angular rate sensor is such that the excitation of the resonant structure which includes the sensing element has to be driven in a plane normal to the desired plane of the excited motion. In an angular rate sensor, excitation electrodes must excite the sensing element of the sensor to a vibration mode which is essentially a motion parallel to the surface of the excitation electrodes. Therefore, the device must be designed such that the excitation motion has components in a direction normal to the desired plane of the excited motion.

A sensing element of such a sensor includes one or more masses attached to a beam. Current devices achieve the desired excitation characteristics via beams with a specially designed geometry. The cross-section of the beam is created to be asymmetric (see FIG. 1 showing a beam 1 and masses 2) and to have a geometry such that its principal axis is not parallel to the surface normal of the mass. Therefore, the beam has a tendency to bend out of the surface. The result is that an excitation mode has small components out of the surface plane of the mass and hence can be driven electrostatically from the side of the plane of the mass.

A problem with this approach is that, due to the complicated cross-section of the beam, the manufacture of the sensing element requires more process steps than is desirable. This is also the case for other micromechanical devices using resonant structures.

Further problems occur with such devices because the resonant structure includes single-crystal silicon, which is anisotropic. The mechanical properties of the structure are therefore extremely dependent on the alignment of the anisotropic material. Even slight misalignments of the crystal, from which the beam is made, cause large errors in the motion of the beam, such as a large quadrature offset.

SUMMARY

According to the present invention there is provided a resonant structure for a micromechanical device, the resonant structure including: a beam made of crystalline silicon; and at least one mass attached to the beam; wherein the resonant structure has an excitation plane in which motion of the excited resonant structure predominantly takes place and the beam has crystal axes aligned such that none of the crystal axes are parallel to the length of the beam and/or none of the crystal axes are normal to the excitation plane.

According to the present invention there is further provided a micromechanical device including: at least one resonant structure as defined above; an excitation component arranged to excite motion of the resonant structure.

According to the present invention there is further provided a method of exciting a resonant structure in an excitation plane in a micromechanical device, the method including: providing a resonant structure including a beam made of crystalline silicon having crystal axes aligned such that none of the crystal axes are parallel to the length of the beam and/or none of the crystal axes are normal to the excitation plane; and exciting motion of the resonant structure in a direction normal to the excitation plane.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the device, it should be understood that variations may and do exist and would be apparent to those skilled in the art based on the descriptions herein.

BRIEF DESCRIPTION OF THE DRAWINGS

The device is explained in more detail below with reference to exemplary embodiments, where.

DETAILED DESCRIPTION

In the following detailed description, reference is made to accompanying drawings which form a part hereof and in which is illustrated by way of illustration, specific embodiments in which the device may be practiced. In this regard, directional terminology such as: "xy-plane", "z-direction", "x'-axis", "z'-axis", etc. is used with reference to the orientation of the figures being described. Because components of the embodiments of the present invention can be positioned in a number of different orientations, the directional terminology is used for purposes of illustration and is no way limiting.

Figure 2:
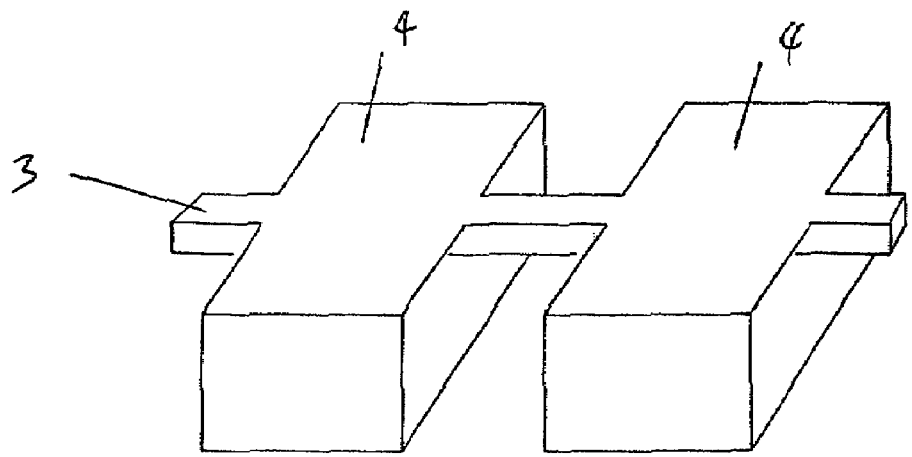
FIG. 2 is a perspective diagram of an example resonant structure according to the present invention.

Referring to FIG. 2, a resonant structure according to the present invention has a beam 3 and one or more masses 4 attached to the beam. The resonant structure may be, for example, a sensing element or part of a device which 'harvests' energy from rotation of a wheel for powering a device such as a sensing device.

Figure 3:
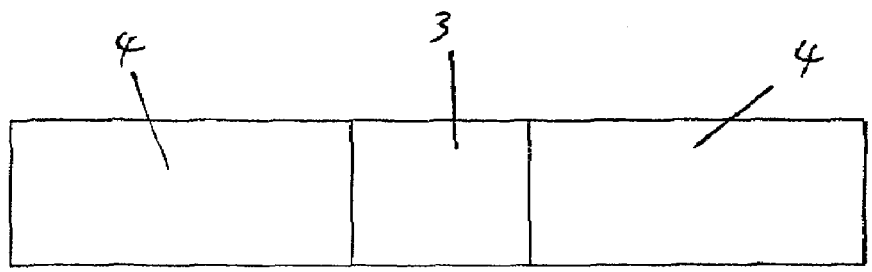
FIG. 3 is a diagram of the cross-section of the resonant structure shown in FIG. 2.

The beam has a regular cross-section, for example rectangular, as shown in FIG. 3. The long axis of the beam 3 (x-direction in FIG. 2) is aligned to not coincide with a crystal axis of the silicon wafer from which the beam is made, but instead, the beam 3 is rotated, for example, about the z-axis, relative to such an axis. Alternatively, the crystal orientation can be rotated relative to the surface of the structure (xy-plane in FIG. 2) so that none of the crystal axes are parallel to the length of the beam and/or none of the crystal axes are normal to the surface (z-axis).

By rotating the crystal orientation relative to the beam structure, it is possible, for certain orientations, to obtain a beam 3 that is very robust with respect to crystal misalignment so that quadrature offset is minimized if misalignment occurs.

Additionally, rotation of the crystal orientation relative to the beam 3 means that the beam 3 has principal bending planes that are not parallel to the surface of the structure (xy-plane). This means that it is possible to excite motion in the xy-plane by driving motion in the z-direction with an excitation component, so, for example, enabling excitation and detection of a sensing element to occur from a single side of the sensing element. External angular movement (such as of a vehicle in which the sensing element is located) causing Coriolis forces on the resonant structure can be detected by detecting the resultant movement of the excited sensing element in the z-direction.

Figure 4:
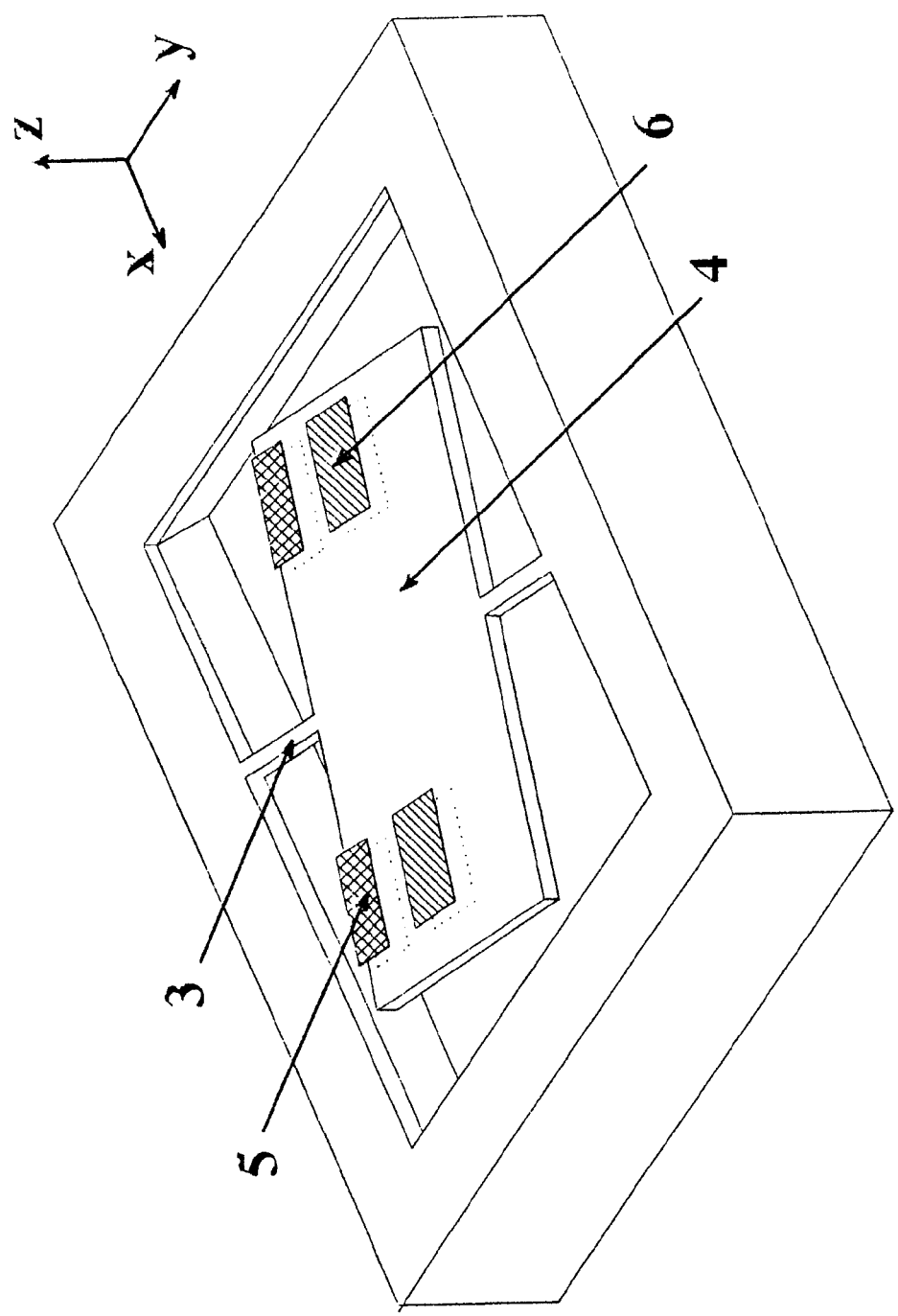
FIG. 4 shows an example micromechanical device comprising a sensing element, according to the present invention.

FIG. 4 shows a micromechanical sensing device comprising a resonant structure functioning as a sensing element. The beam 3 axis is rotated about an axis (z-axis) normal to the surface of the beam 3 and mass 4 which is the excitation plane (xy-plane). This example device has excitation electrodes 5 and detection electrodes 6 and senses angular rate about an axis parallel to the xy-plane. A device may comprise more than one such resonant structure.

Figure 1:
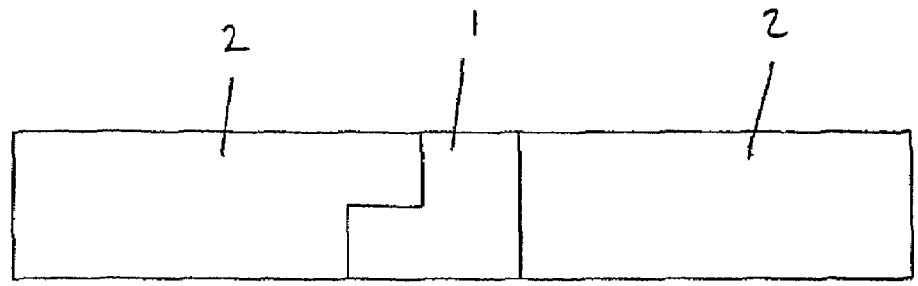
FIG. 1 is a diagram of the cross-section of a prior art sensing element.

With a sensing element according to the present invention it is possible to make a sensing device which exhibits equivalent behavior to conventional devices with irregular beam cross-sections, but with the advantage that the number of processing steps needed in manufacture of the sensing element is reduced. (See the rectangular beam 3 in FIG. 3 as compared to the prior art beam 1 with complicated cross-section in FIG. 1.)

Figure 5:
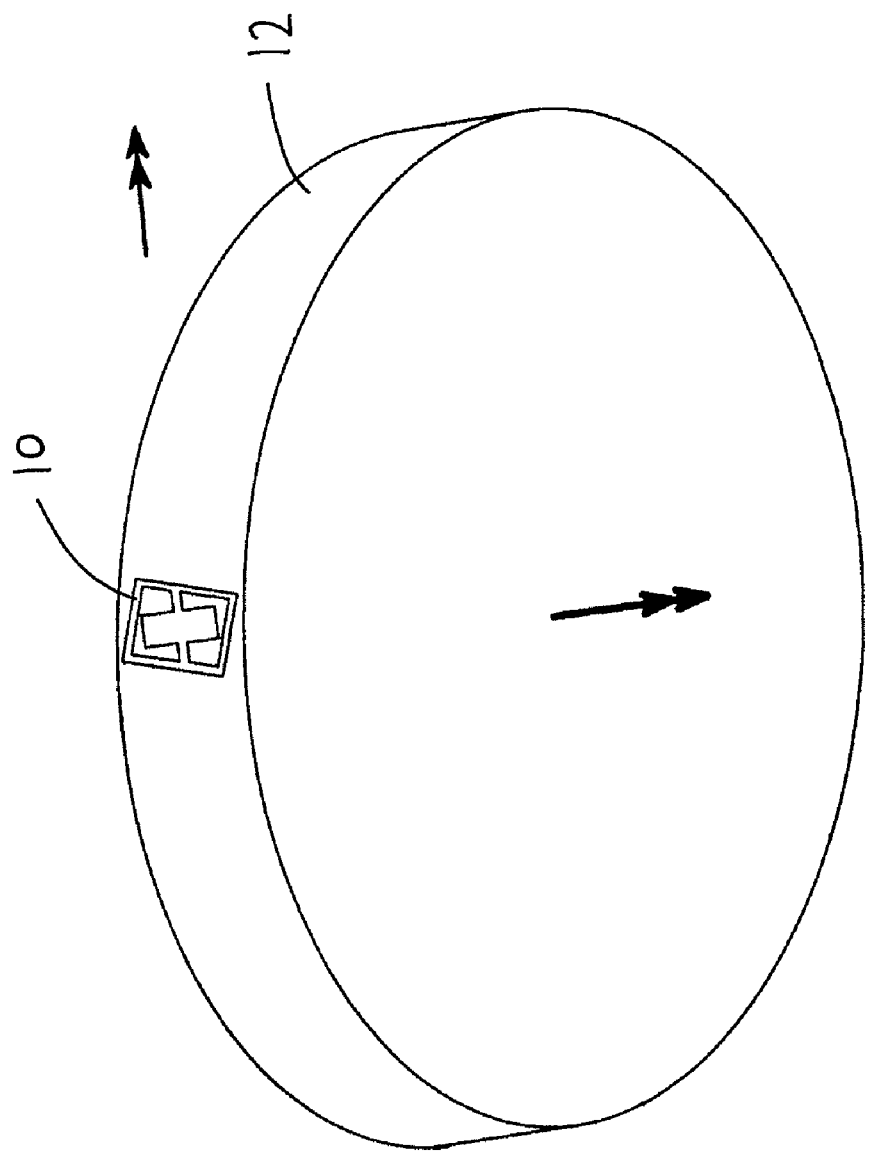
FIG. 5 shows a micromechanical device fixed to a wheel so as to be implemented for use as a power generation device.

Another example use for a resonant structure according to the present invention is in a power generation device for use on a wheel (e.g., device 10 provided on wheel 12 of FIG. 5, with device 10 being similar in design and operability as that described above and shown in FIG. 4), where Coriolis movement can be converted into useful energy, some of which can be fed back into the device to drive the excitation component and some of which can be used to power a sensing device on the wheel.

The crystal orientation of a wafer in a particular plane can be altered by rotating the wafer relative to the geometry of the structure it comprises because wafer shaping techniques, such as reactive ion etching, known to a person skilled in the art do not depend on crystal orientation.

The optimal crystal orientation for a particular resonant structure can be found by mechanical considerations of the geometry of the beam and structure as a whole and also by consideration of material properties. Relevant analytical techniques are known to a skilled person, the easiest method being a numerical method such as Finite Element Analysis.

There exists for each structure geometry an optimal crystal orientation for reducing the problem of quadrature offset and an optimal crystal orientation for enabling excitation and detection/energy extraction to occur from the same side of the resonant structure. These two optimal crystal orientations may be the same or different, depending on the geometry. However it is not necessary to have the optimum crystal orientation for either one of these aspects to have a functional device. There exist crystal orientations that reduce quadrature problems and at the same time enable excitation from the detection/energy extraction side.

Depending on the application, it may be desirable for example to have a crystal orientation giving minimum quadrature problems, with the rest of the geometry being designed to give sufficient performance for the remaining criteria, including excitation from the detection/energy extraction side. Another possibility is to have a crystal orientation giving a relatively good performance for both aspects.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this device provided they come within the scope of the appended claims and their equivalents.

What is claimed is:

1. A micromechanical device comprising:
    a resonant structure comprising a crystalline silicon beam and at least one mass attached to the beam, wherein the beam is connected with a supporting structure at first and second opposing ends of the beam, the beam further includes crystal axes aligned such that no crystal axis is parallel to a length of the beam and/or no crystal axis is normal to a surface of the at least one mass, and the resonant structure is configured such that, during use of the micromechanical device, when the resonant structure is excited in a direction normal to the surface of the at least one mass, motion of the excited resonant structure predominantly takes place in a plane substantially parallel to the surface of the at least one mass; and
    an excitation component arranged to excite motion of the resonant structure in a direction normal to the surface of the at least one mass.

2. The micromechanical device according to claim 1, wherein the resonant structure comprises a motion sensing element.

3. The micromechanical device according to claim 1, wherein the device comprises a sensing device that further comprises a detection component arranged to detect, during use of the micromechanical device, motion not caused by the excitation component, wherein the motion not caused by the excitation component is in a direction normal to the plane substantially parallel to the surface of the at least one mass.

4. The micromechanical device according to claim 1, wherein the resonant structure is arranged to be excitable to a predominantly rotational excitation mode.

5. The micromechanical device according to claim 1, wherein the device comprises a power generation device and the resonant structure is arranged to be excitable to a predominantly rotational excitation mode, the resonant structure is fixed to a wheel such that, during use, a rotational axis of the excited resonant structure is substantially perpendicular to a rotational axis of the wheel, and the micromechanical device further comprises a power extraction component configured to generate power via converting Coriolis motion of the excited resonant structure.

6. The micromechanical device according to claim 1, wherein the excitation component is arranged to electrostatically excite motion of the resonant structure.

7. A method of exciting a resonant structure in a desired plane in a micromechanical device, the method comprising:
    providing a resonant structure comprising a crystalline silicon beam including crystal axes aligned such that no crystal axis is parallel to the length of the beam and/or no crystal axis is normal to the desired plane, and at least one mass attached to the beam, wherein the beam is connected with a supporting structure at first and second opposing ends of the beam; and
    exciting motion of the resonant structure in a direction normal to the desired plane, wherein the desired plane is substantially parallel to the surface of the at least one mass.

* * * * *